(12) United States Patent
Breeden et al.

(10) Patent No.: US 7,448,024 B2
(45) Date of Patent: Nov. 4, 2008

(54) SYSTEM AND METHOD FOR SOFTWARE APPLICATION DEVELOPMENT IN A PORTAL ENVIRONMENT

(75) Inventors: Timothy Breeden, Boulder, CO (US); Doug Dew, Boulder, CO (US)

(73) Assignee: BEA Systems, Inc., San Jose, CA (US)

( * ) Notice: Subject to any disclaimer, the term of this patent is extended or adjusted under 35 U.S.C. 154(b) by 385 days.

(21) Appl. No.: 10/733,989

(22) Filed: Dec. 11, 2003
(Under 37 CFR 1.47)

(65) Prior Publication Data
US 2006/0206856 A1 Sep. 14, 2006

Related U.S. Application Data

(60) Provisional application No. 60/432,749, filed on Dec. 12, 2002.

(51) Int. Cl.
*G06F 9/44* (2006.01)
(52) U.S. Cl. ...................................... 717/125
(58) Field of Classification Search ................. 717/147, 717/101–113, 125, 132; 715/713, 234; 709/218, 709/220, 227–228
See application file for complete search history.

(56) References Cited

U.S. PATENT DOCUMENTS

| | | |
|---|---|---|
| 6,327,628 B1 | 12/2001 | Anuff et al. |
| 6,463,578 B1 | 10/2002 | Johnson |
| 6,647,544 B1 | 11/2003 | Ryman et al. |
| 7,051,316 B2 * | 5/2006 | Charisius et al. ............ 717/103 |
| 7,069,553 B2 * | 6/2006 | Narayanaswamy et al. . 717/173 |
| 7,240,280 B2 * | 7/2007 | Jolley et al. .................. 715/234 |
| 2001/0047402 A1 | 11/2001 | Saimi et al. |

OTHER PUBLICATIONS

IBM's "Portalizating Domino Applications for WebSphere Portal", Redbooks, Sep. 2003. Whole Manual.*
BEA Takes Bite Out of Microsoft Pie, Gavin Clarke, Apr. 1, 2002, 3 pages.*
Walkabout-A Retargetable Dynamic Binary Translation Framework, Cristina Cifuentes et al, Jan. 2002, 30 pages.*

\* cited by examiner

*Primary Examiner*—Tuan Anh Vu
(74) *Attorney, Agent, or Firm*—Fliesler Meyer LLP (57) ABSTRACT

A design/compile-time, and runtime software development system that allows developers of varying levels of expertise to build enterprise applications with dynamic user interfaces. The system allows for building dynamic web pages which connect to data sources on the back-end, and which may be integrated into a portal on the front end. In one embodiment the system comprises an IDE having a design-time environment that allows the design of a portal application, said design-time environment including a Java Server Page design editor component, and a webflow design editor component; a run-time environment for execution on a server and that runs said portal application, said run-time environment including a control container and lifecycle driver component, a control factory component, and an application flow and state management component; wherein the system can be switched from the design-time environment to the run-time environment, to automatically effectuate changes from one environment to the other.

24 Claims, 4 Drawing Sheets

SYSTEM AND METHOD FOR SOFTWARE APPLICATION DEVELOPMENT IN A PORTAL ENVIRONMENT

CLAIM OF PRIORITY

This application claims the benefit of U.S. Provisional Application "SYSTEM AND METHOD FOR SOFTWARE APPLICATION DEVELOPMENT IN A PORTAL ENVIRONMENT", Ser. No. 60/432,749; filed Dec. 12, 2002, and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to software application development, and particularly to a system and method for application development in a Web portal environment.

BACKGROUND

The development of software applications is an important activity of most modern technology companies, particularly those that are involved with e-commerce. However, while much attention has been given to software development suites that allow for the development of the underlying software application logic, less attention has been given to creating development suites that can be used to generate a complete software application user interface. This is particularly relevant in the portal application arena (including for example web portals, Internet portals, enterprise portals, etc.), since a portal is designed to provide a wide variety of applications in a graphically rich yet consistent environment.

Common complaints about traditional development suite offerings include that the widely-used Java Server Page (JSP) programming language is by itself too difficult for software developers to use in developing portal applications. These users (i.e., software developers and the companies who use these development suites) report that they spend too much time, money, and expertise building web applications. They would like to be able to have developers who are not Java experts to be able to productively build web pages.

Another common complaint is that "Net" style applications are changing the world: including the rise of instant messaging (IM), web services, and pervasive computing, etc. The twin innovations of heterogeneous client devices (including, for example, browsers on PCs; and other types of client software such as Java 2 Micro Edition (J2ME)), and service-oriented architectures, create both an opportunity and a threat to today's current application server vendors in that the prototypical applications that people build are changing fundamentally. If those vendors don't respond to these demands then they will be exposed to other vendors who are more agile. Current technologies, such as Microsoft's .NET framework contain an application development environment for building dynamic web pages using Application Server Pages (ASP), and market research indicates a development suite IDE offering is incomplete without a User Interface (UI) component. However, to date none of the Java-based application server providers have developed a system that caters to this category of developers and provides them with an easy yet powerful means for creating web and portal applications.

SUMMARY

An embodiment of the invention provides both a design-time and runtime system that makes it easy for developers of varying levels of expertise to build enterprise applications with dynamic user interfaces, and then to deploy those applications on enterprise application platforms, for example on a portal product such as BEA's WebLogic Server Portal. As described herein, the system provides a framework that allows for building dynamic web pages which connect to data sources and web services on the back-end, and which may be integrated into a portal on the front end. Additional embodiments extend the functionality of the system to accommodate both heterogeneous and disconnected clients, and to more tightly integrate the framework with existing content management and portal platforms.

DETAILED DESCRIPTION

An embodiment of the invention provides both a design-time and runtime system that makes it easy for developers of varying levels of expertise to build enterprise applications with dynamic user interfaces, and then to deploy those applications on enterprise application platforms, for example on a portal product such as BEA's WebLogic Server Portal. As described herein, the system provides a framework that allows for building dynamic web pages which connect to data sources and web services on the back-end, and which may be integrated into a portal on the front end. Additional embodiments extend the functionality of the system to accommodate both heterogeneous and disconnected clients, and to more tightly integrate the framework with existing content management and portal platforms.

More particularly, an embodiment of the present invention provides an application development system that assists in the developing, debugging, testing, deploying, and running of web applications. The features of this application development system include:

A model for server-side controls that in turn provides a simple model for constructing and re-using presentation and application logic for web applications;

Separation of the presentation logic from the application and business logic, thereby focusing development more specifically on the different users involved (for example web designers, web developers, and J2EE developers);

A common programming model to be used for all development tasks. Embodiments of the invention can be used to provide the same integrated development environment (IDE), framework, and model, for building the application user interface (UI) as is also used for building the server-side resources such as web services. This helps unify development models across the various tiers of a complex application; and, A model for creating complete web applications, not just web pages. The system may utilize such features as webflow technology to provide an overall framework for how developers should think about building their web pages and applications.

The overall effect of these features is to provide a system that allows developers to build web applications for use on an application server, and particularly for use in a portal environment, much faster than with the traditional JSP style of development. By providing an easy-to-use framework, together with controls for constructing elements of dynamic web pages, the use of the present invention results in a significant increase in the developers productivity, including allowing for one-click integration of portal applications and other applications. Web pages that participate in business processes may be easily deployed and integrated into the portal framework.

As described herein, an embodiment of the present invention provides a framework for next-generation User Interface (UI) development, which can be tightly integrated with other development products such as BEA's WebLogic Workshop, includes extensibility for controls, and provides a model and architecture that can be extended over time to support additional types of clients, such as J2ME and Flash clients.

System Architecture

Figure 1:
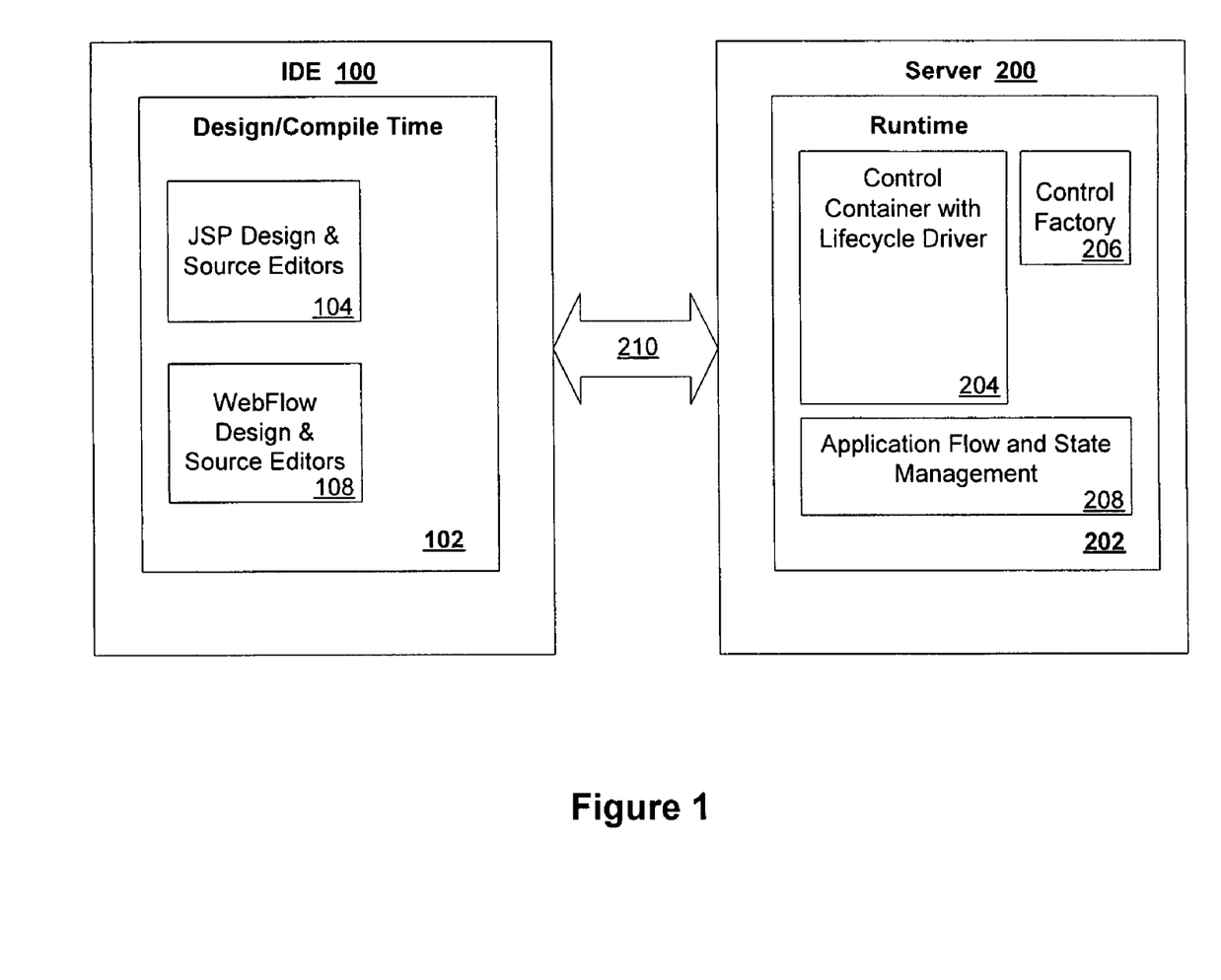
FIG. 1 shows an architectural overview of the principal design-time and runtime components of an embodiment of the present invention.

FIG. 1 shows an architectural overview of the principal design-time and runtime components of one embodiment of the present invention. As shown in FIG. 1, the design/compile time environment 102 (hereafter simply referred to as design-time environment) is provided to the developer as an integrated development environment (IDE) 100. The IDE includes design-time components, for example a Java Server Page (JSP) Design/Source Editor 104, and a Webflow Design/Source Editor 108. The JSP Design/Source Editor is used to edit and create JSP pages prior to deployment, while the Webflow Design/Source Editor 108 is used to edit the Webflow that will eventually determine the logical flow of the application once it's deployed. The runtime environment 202 exists or executes upon or as part of an application server or a comparable server, such as for example the WebLogic Server Portal product from BEA Systems, Inc.

In accordance with one embodiment, the runtime components include a Control Container and Lifecycle Driver 204 and a Control Factory 206, which together are used to determine the actual look-and-feel of the application interface. An Application Flow and State Management component 208 uses the previously created webflow information to determine the current state and logical flow of the application as it is being used. Since the design-time and runtime environments are provided as part of a single framework, the developer can easily move or switch (as indicated by the bidirectional arrow) 210 from one environment to the next, and back again, to quickly update and deploy portal applications.

The following sections provide descriptions of the major modules of the system shown in FIG. 1.

Design-Time Environment

Figure 2:
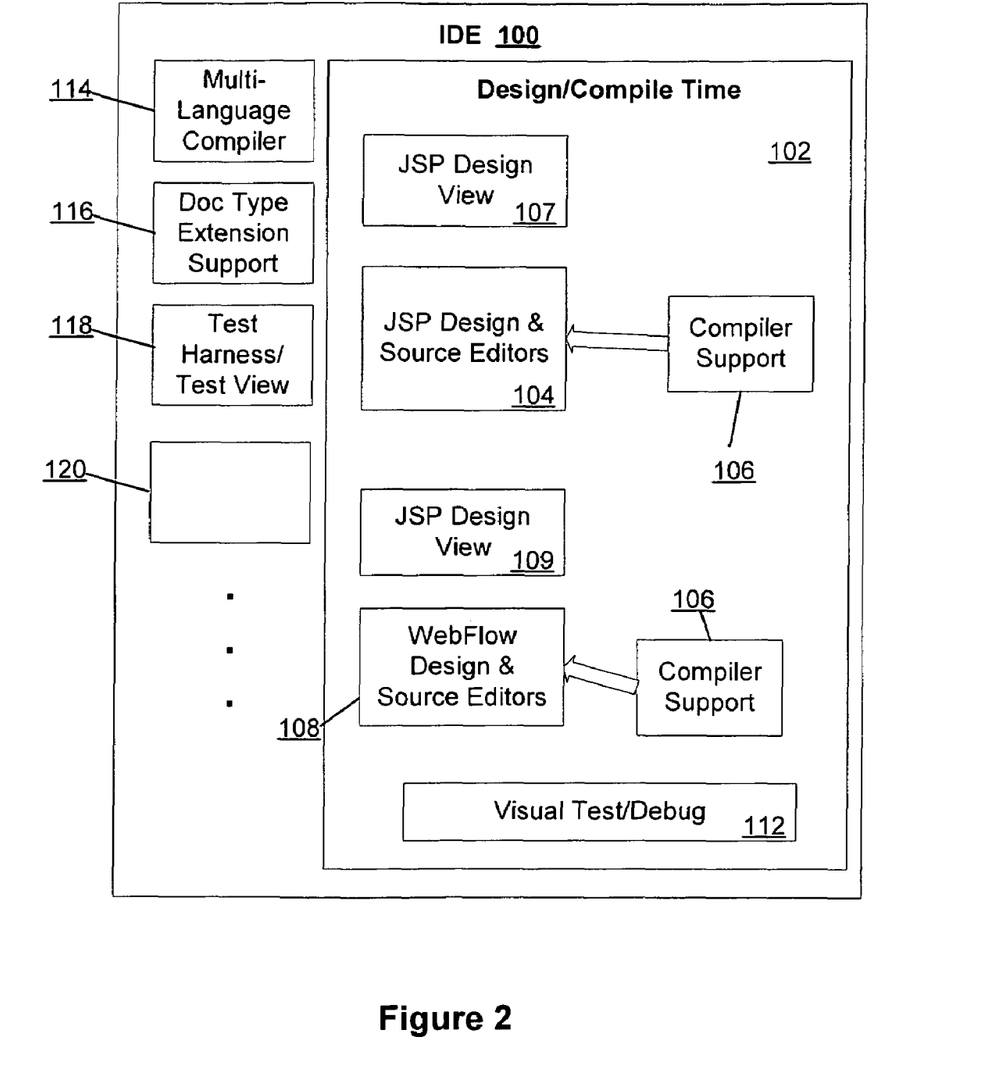
FIG. 2 illustrates a design/compile-time environment in accordance with an embodiment of the invention.

FIG. 2 illustrates a design-time environment 102 in accordance with an embodiment of the invention. The design-time environment 102 allows a portal application developer to develop JSP-based portal applications using a collection of easy-to-use design and source editors. A JSP design and source editor 104 can be used by the developer to create and edit the Java Server Page source code for a JSP-based portal application page, (as indicated by its JSP design view 107).

Support for additional or third-party JSP compilers 106 may also be included. A webflow design and source editor 108 allows the developer to edit the webflow file or similar logical properties underlying the application (also indicated by its JSP design view 109). Support for additional webflow compilers 110 may similarly be included.

In the embodiment shown in FIG. 2, a visual test and debug component or module 112 is included, which allows the developer to visually test and debug their portal application prior to launching it as an active portal. The design-time environment also includes, in some embodiments, a multi-language compiler 114, to provide support for multiple languages, document type extension support 116, and test harnesses and views 118 (where desired). Additional components or modules 120 can be incorporated as necessary to provide additional functionality.

JSP Visual and Source Editors

In accordance with one embodiment, the JSP design and source editor 104 includes a visual editor. The visual editor provides the graphical design surface that is used by the application developer to design their web pages. From the developer's point of view the visual editor provides the face of the development system from a page perspective, not from a site perspective. Palettes of available controls can be provided and can be placed by the developer onto a page via a drag-and-drop mechanism. The application developer may access such controls from a visual perspective, and a close-to-WYSIWYG (what you see is what you get) design surface is ultimately rendered.

The application developer is at all times able to switch to a source view of the JSPX page from the design surface of the JSP visual editor. The JSPX source code or source file contains references to controls whose appearance is much like a tag library instance.

In addition to the graphical design editor, the application developer can also access a backing .java file, which defines the logic found in the page, and which may or may not be separate from the JSPX source file. The .java file typically contains event processing code corresponding to User Interface (UI) control events, and assists in separating the presentation logic from the business logic.

Application Flow/State Management Visual and Source Editors

In accordance with one embodiment, the webflow design and source editors 108 include a set of Application Flow and State Management editors. Application Flow and State Management editors provide the backbone of actual web site editing, beyond the page design offered by the JSP visual and source editors described above.

The Application Flow visual editor provides a visual snapshot of the site flow, and any site processing that dictates flow decisions. Similar to a flowchart, the Application Flow visual editor provides a mechanism by which the application developer can specify the site flow through a series of pages, page groups, flows, and subflows.

In addition to these graphical flow-editing capabilities, the application developer has access to the webflow (.wfl) source file editor from within the Application Flow visual editor. Any editing done in either the visual or source Application Flow tools is automatically reflected in the other as the developer designs and tests their site flow.

WebFlow

The WebFlow represents each page in a given WebFlow, the transitions between the pages, and the interactions of the pages with server-side components. The primary purposes of the WebFlow designer are:

a) to provide the developer with an higher-level view of their application than simply a web page, and
b) to make it easier for the developer to code and review conditional display of pages based on a current state.

The WebFlow must be described in an easy way so that developers can write the conditional logic that determines which pages get rendered as a result of which state and which user action. This logic can be represented using simple code, such as Xscript for example. In one embodiment when the developer is viewing a WebFlow, the IDE provides two navigator tabs, enabling the developer to easily navigate between the design view and the source view.

In accordance with one embodiment, a WebFlow Designer tool is included which provides a graphical representation of a WebFlow file. A primary goal of the WebFlow designer is simplicity, clarity, and seamless integration with the web page design views. This accords with the notion that it's more important that the model presented by the designer work correctly than it merely appear nice. The WebFlow Designer is closely integrated with a facility for writing the code for the transitions between pages.

Features that may be included in the WebFlow Designer in accordance with one embodiment include:

A palette for creating new representations of web pages (which may actually be a new page, or a page that has already been created);

A design surface representing the web pages and their relationships. The surface fills the main window of the IDE, with the palette and properties available from the same view on a side bar;

The ability to click on the design view of a transition between pages and then use an easy mechanism (e.g. dialog box) to write the code that handles incoming state from the input page and from the server-side object, the decision of which page to render, and the outgoing state to the new page;

The ability to set page properties (for example name, caching characteristics, input values, etc.) by selecting a page in the WebFlow design view;

The ability to resize the flow representation;

The ability to jump to the code of a specific web page by double-clicking on its representation;

A wizard/dialog box/task help;

A "mini" view of the WebFlow from the IDE when the user is editing a WebPage;

The re-use of WebFlows. A given WebFlow file may be used in multiple applications, or in multiple places within a single application;

The ability to wire two WebFlows together, assuming that the landing page of one becomes the input page of the other (i.e., sequential interactions.)

The ability to invoke a debugger at the WebFlow level; and,

The ability to select a subset of the pages in the WebFlow, set properties on them, reuse them, and cut/paste/copy into the design view. This is the notion of "page groupings".

It should be noted that these features are illustrative of features that can be provided by various embodiments of the invention, and that some or all of such features may or may not be included in any particular implementation.

In accordance with one embodiment a webflow Source View editor is included which allows the developer to edit the source file that actually describes the WebFlow of the application. For the software developer, the editing experience of this file is similar to that of editing .jws files—together with common code-editing features such as code complete, syntax color highlighting, squiggling underlining, debugging (with the ability to set breakpoints), etc. The Source View Editor (and the file itself) is designed to be something that the developer is comfortable editing, with the possible assistance of the WebFlow designer. The Source View also interacts seamlessly with the Design View, so that any action the user can take in the design view is also "doable" in the source view.

Design View

Embodiments of the invention include a means to render within the IDE a "design view" of .JSP, .JSPX, and .HTML pages. The goal of the design view is not fidelity of representation, but rather providing a reasonable approximation of the overall layout of a page so that the developer can make basic formatting (but not necessarily graphic design) decisions. The design view renders both embedded controls and standard HTML, and includes a palette of controls that are used by dragging and dropping onto the design surface. The design view also contains properties for each instance of a control on the design surface, as well as properties for the overall page. A means is provided for navigating between the design view of a page and the design view of a webflow that contains the page, together with basic editing features such as undo/redo, cut/copy/past, print, etc.

File Editor

Embodiments of the invention include a file editor, with which the developer is also able to edit .JSP, .JSPX JSPX, and HTML files in "source view". The JSP editor enables developers to write, debug, and test standard JSP pages and custom tag libraries. The .JSPX editor provides all the support for tags that a developer might expect: including syntax color highlighting, squiggly underlining, prompting for mandatory tag attributes, validation of tag attributes, etc., and also provides the ability for customers to easily write HTML in the IDE. HTML tags can be automatically recognized, or highlighted, etc.

Page Properties

Embodiments of the invention allow page properties to be set from either the Page editor (when no control is selected, the page properties are displayed), or from WebFlow (when a page is selected, its properties are displayed). Page properties are likely to include values such as: the Page Title; the use of Caching—i.e. programmatically determine how and for how long a web page is cached on the server; Default styles; Input parameters, and output values; Security—i.e. who is entitled to view the page; and, how the page state is persisted (i.e., server side vs. client side).

Debugging

Embodiments of the invention allow backing files to be debugged using a Java debugger. A developer may also choose to debug through a given WebFlow so that they can, for example, set a breakpoint in the transition from one page to another, or within a backing file. Developers can set these webflow breakpoints using a code view of the WebFlow file, or from the graphic design-view of the webflow.

Controls

In accordance with an embodiment of the present invention, controls can be used within the source and page editors to embed functionality within the application page or portal. The following section lists some controls that can be used with the invention to allow the developer to create complex web and portal applications in a quick and easy manner. Generally, controls can be divided into two categories—"Presentation Controls", and "Business Controls".

Presentation Controls are generally directly translatable into HTML. The following presentation controls are example of those that may be provided:

Form controls and their contents (text boxes, radio buttons, list boxes, buttons, labels, etc.): Forms and form controls may optionally be bound to data validation logic, server-side objects (e.g. db control), or webflow depending upon the properties set on the controls. For example, a Button can have bi-modal behavior depending on whether or not it is set to invoke or to continue a webflow.

Placeholder controls: These controls are used for representing a block of .HTML.

Label/Imagine/Anchor controls: These controls are used for linking HTML, JPEGS, or GIFs to other web pages.

Style/layout controls: The system provides the ability to describe flow within a page. This requires being able to select, using style/layout controls, a group of presentation controls within a page.

Business Controls provide a standard Java interface to resources such as EJBs, web services, SQL commands that are to be executed against a database, etc. Developers can then consume business controls in two ways: either by writing Java code and WebFlows that interact with these controls; or by binding page controls (such as tables and forms) to business controls.

Run-Time Environment

Figure 3:
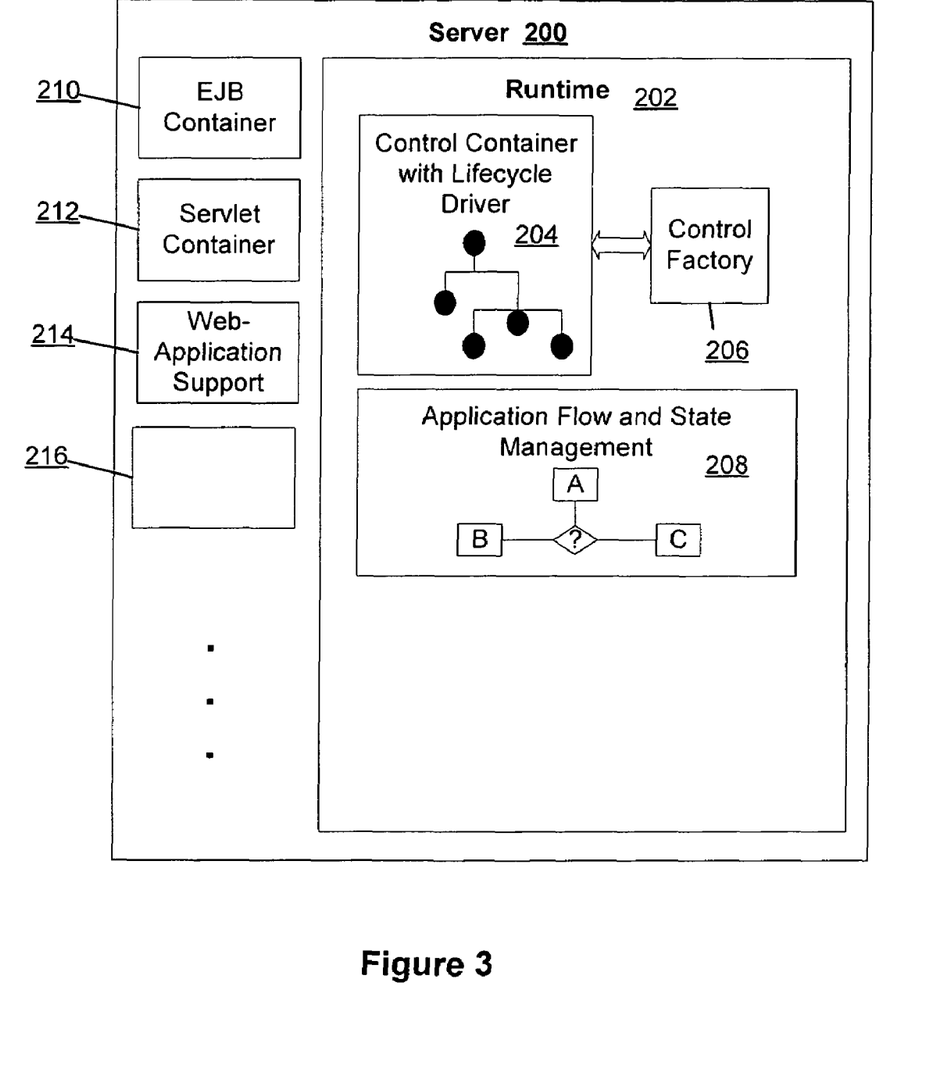
FIG. 3 illustrates a runtime environment in accordance with an embodiment of the invention.

Once the portal page or application has been developed, it can then be deployed onto a server and made accessible to the end user. In addition to providing an integrated development environment, the system described herein also provides support for post-deployment runtime features. FIG. 3 shows a run-time environment in accordance with an embodiment of the invention. The run-time environment 202 allows a portal application developer to quickly deploy JSP-based portal applications previously created in the design-time environment 102. As shown in FIG. 3, in accordance with one embodiment, the run-time environment includes a Control Container and Lifecycle driver 204, which together with the control factory 206 is used to provide the presentation and business controls on the portal application. An application flow and state management 208 is used to control the logic of the portal application. The run-time environment also includes support for accessing EJB containers 210, servlet containers 212, and Web applications 214.

The control container 204 uses a factory for control creation, and subsequently drives control lifecycles during application request handling. In one embodiment this lifecycle control is accomplished by the control container using wire-up code generation via JSP-compilation (JSPC) modification, in concert with the generated _jspService( ) method of the (JSP) servlet. Other models may be supported, including those specified in the Java Standards Requirement JSR-127 standards document, incorporated herein by reference. The controls that live within the container may span such categories as HTML controls, HTML forms controls, data-bound controls, and "rich" controls (for example smart forms/smart tables).

Development systems or IDE's created in accordance with the present invention provide features beyond simple ASP or .NET style products by offering instead a site-centric approach to web page and web application design. Proper application state management 208 from page to page is the inherent responsibility of the Application Flow engine. As used in one embodiment, a WebFlow infrastructure is used to support and form the backbone of the system. Such WebFlow infrastructures can be provided by e-commerce products such as the Personalization Server product from BEA Systems, Inc. As used in these products, Application Flow and State Management is guided by a file format (.wfl) which exploits annotations that declare possible destinations of a flow transition, according to flow processing. In addition, the .wfe file format dictates what state is shared between which pages, and between which page groups.

Figure 4:
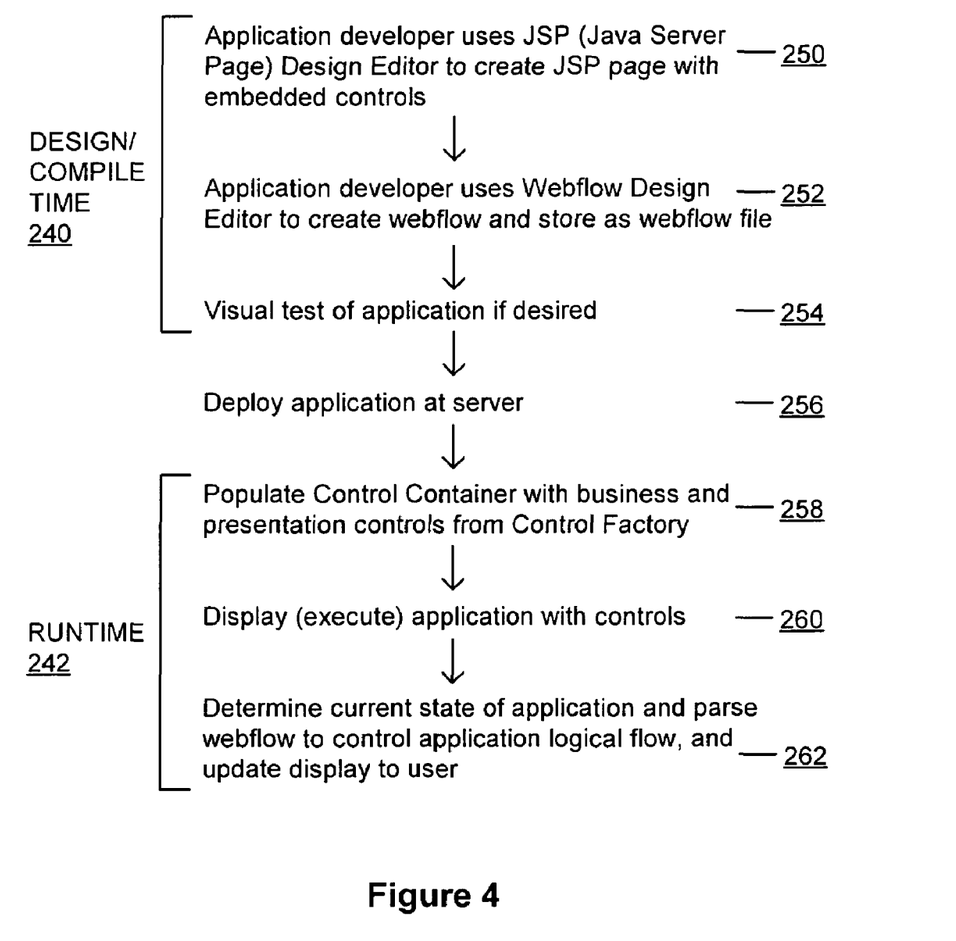
FIG. 4 illustrates a flowchart of an application development process in accordance with an embodiment of the invention.

FIG. 4 illustrates a flowchart of an application development process in accordance with an embodiment of the invention. As shown in FIG. 4, the process includes Design time and Runtime steps. In step 250, the application developer uses the JSP (Java Server Page) Design Editor to create or update a JSP page, together with embedded controls where desired. In step 252, the application developer uses the Webflow Design Editor to create a webflow and store the webflow as a webflow file (or in some other manner depending on the specific system implementation). Optionally, the developer may, in step 254, perform a visual test or debug of the application. If everything is satisfactory the application is deployed to the server, in step 256. In step 258, the application or portal server populates the Control Container with any needed business and presentation controls from the Control Factory. The application is then displayed or executed, in step 260, together with any applicable controls. In step 262, the system continuously determines the current state of the application, parses the webflow to determine the application logical flow, and then automatically updates the display to the user.

Target Developers

The software developers who may benefit most from the development system of the present invention include those who do the "bread and butter" of enterprise UI development today. These developers may currently use products and technologies such as VisualBasic, Swing, or Powerbuilder for thick client UI development, or they may use products such as ColdFusion, .ASP, CGI, or .JSP for web development. This class of software developers have a few things in common: They are essentially procedural developers, and they are comfortable writing code, very often script, but they are not as comfortable with heavy-duty Java or C++. Such developers have no problem understanding what objects are, and are familiar with consuming objects, but they are less likely to design objects or EJBs themselves. In short, the target developer is typically one that prefers simplicity to complexity. Application Program Interfaces such as JDBC and JNDI represent barriers to J2EE that these developers don't want to have to surmount. These developers utilize an iterative development cycle, and typically want to very quickly iterate between the process of constructing their code and testing it out. The development framework must enable them to very rapidly write code and then debug or test it.

The invention also addresses the needs of those developers who may not be particularly skilled graphic designers. These target developers are those who focus on writing the application logic and presentation logic for web applications. For them, the look and feel won't be as important in these instances (e.g. for developing an intranet expense reporting system), and a graphic designer may not be involved at all. In other instances the web developers will work closely with a graphic designer who might be using a graphical development product such as Macromedia's Dreamweaver.

The following section outlines the various types of people who may be working on an application development team together with the target developer.

Analysts: Analysts work with customers (internal and/or external) to understand and document the business requirements of the application to be built, and engineers to determine what is possible and what is not. They write the functional specifications for the application, and they also participate in defining what the screens should look like, writing content for the pages, reviewing prototypes, and testing.

Graphic designers: Graphic designers take the functional specifications and work with the web developers, customers, and analysts to understand what the screens should look like. They are primarily interested in aspects such as branding, look and feel, usability, and basic design principles. They deliver complete screen mock-ups of what the page should look like, and may have some basic HTML experience, which they might use in performing the mock-ups, but will typically never write script or other code.

Web developers: Web developers take the design and the functional specification and write the front-end of the application. In small projects they may do most of the design work; while in large projects they may do no design work at all. This includes the HTML, client-side script, server-side script for generating dynamic web pages, in addition to any code for integrating with databases or back-end systems. They work with the analysts and the designers to iterate through designs until the overall design is complete and work with the systems engineers and database administrators (DBAs) to understand how to interface to back-end systems.

Integration/applications developer: These engineers have similar skills to a web developer, but they are focused on integration with systems, and very often with packaged applications. For example, the application developer might use SAP's ABAP interface to design interfaces for the web developer to then call into a SAP system, they may design workflows (with data transformations) using a Business Process Management (BPM) tool, etc. Or they might use the development system to build web services. The web developer typically must work with the integration engineer to understand how to get at the data he/she needs.

Systems engineers: These engineers build the middle-tier logic and communications infrastructure, such as applications that expose legacy systems, or that implement the application security architecture, etc. System engineers typically design a lot of the business objects that the web developer ends up consuming. They may also review the design work done by the rest of the team.

Database Administrators/Developers: There are two types of Database Administrators (DBA): those who primarily just manage the DB (perform back-ups, own security rights, etc.) and those who also design and approve schema changes, write stored procedures, triggers, etc. Depending on the project, the web developer or systems engineer may ask the DBA to run a script which they have created, or they request the DBA do the design work and implementation themselves. In the case of large projects and/or mission-critical databases, the DBA will have a lot of authority and will act as a gatekeeper, reviewing any and all changes to the DB schema and code.

EXAMPLE APPLICATIONS

The present invention assists in the application development process by providing a development system that can be used by all developers, and particularly by those target developers described above, to build applications for deployment throughout the enterprise, on the web, and at a portal. Enterprise web applications share a number of common development problems:

Web forms may be bound to a web service, an "activity" in BPM, or a stateless session bean. It is possible to use the development system provided by an embodiment of the invention to create a form that invokes a web service or stateless session bean. When the call is synchronous, the resulting response can be easily represented in the return page. When the call is asynchronous (for example if an asynchronous call to a web service is made), then the return (or callback) values may stored in a server-side object.

A Web form may also be bound to a data object. In accordance with an embodiment of the invention, the system can be used to create a form that performs a query or update on a database object. Basic data validation of the form input can be performed on a field-by-field basis, for example by setting properties on the controls that make up the form (e.g. text box, radio buttons, etc.) Validation is done in the context of the entire form (e.g. one radio button choice may not be valid for a certain range in a given text box).

A Web table may be bound to a data object. The system can be used to create tables that then are used to represent result sets from a database query performed at runtime.

Conditional or dynamic pages may be generated based on server-side state. In a number of instances, pages will be displayed conditionally or dynamically based up on either a) the values submitted by the user via a form, b) the link clicked by the user, c) the state of a server-side object or service, or d) the availability of a resource. Developers can describe how various pages are related to one another. This gives them a framework for describing and managing their overall application. The following example illustrates the distinction between conditional generation and dynamic generation:

Conditional Generation:
 1. A user logs in.
 2. If the login is valid, a particular page is displayed.
 3. If not, a different page is displayed.

Dynamic Generation (Same Page Structure, Dynamic Content):
 1. A user is checking his or her investment portfolio.
 2. They click to navigate between one account and other, and thereby moves from page A to page B.
 3. As the new page is rendered, the server-side logic discovers that the state of the user's notifications has changed—a "sell" order has just been executed.
 4. As a result, page B not only displays the new account information, but also displays a notification in the user's "in" box that a trade has been executed.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, while the embodiments of the system described above are described in the context of BEA WebLogic, WebLogic Workshop, and WebLogic Portal servers, it will be evident that the system may be used with other types of application servers and enterprise servers. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for software application development in a portal environment, the system including a computer comprising at least one processor and at least one memory, the system comprising:

a framework comprising a design-time environment and a run-time environment, the framework adapted to switch between the design-time environment and the run-time environment;

the design-time environment enabling the design and update of a portal application, said design-time environment including a Java Server Page design editor component to create JSP pages, and a webflow design editor component providing a graphical interface with a visual display of portal application flow indicating possible transitions between pages of the portal application, the webflow design editor component being used to create and update a webflow file using the graphical interface, the webflow file including annotations, wherein some of the annotations declare possible destinations of a flow transition, and other annotations dictate what state is shared between which JSP pages;

wherein the run-time environment runs said portal application, said run-time environment including an application flow and state management component using the annotations of the webflow file to determine:

the state and current page of the portal application and when to execute at least one of the JSP pages, wherein the run-time environment deploys the at least one of the JSP pages as indicated by the application flow and management component;

wherein switching to the run-time environment includes enabling the user to deploy the portal application as per the webflow file and the JSPs, the webflow file and the JSPs being defined and modified for the deployment instance; and wherein switching to the design time environment includes enabling the user to access to the Java Server Page design editor component to modify one of the JSPs or to access the webflow design editor and update at least one of the annotations of the webflow file; wherein at least one webflow file is updatable and reusable for one or more the portal application runs; wherein at least one change made in one of the webflow file is dynamically reflected in the webflow editor component.

2. The system of claim 1 wherein the a control container and lifecycle driver component is used to determine the look-and-feel of the portal application interface.

3. The system of claim 1 wherein the a control factory component uses a factory for control creation, and subsequently drives control lifecycles during portal application request handling.

4. The system of claim 1, further comprising using the Java Server Page design editor to create or update embedded controls in a JSP page.

5. The system of claim 1, further comprising performing a visual test or debug of the application.

6. The system of claim 1, further comprising populating a control container at the portal server with business controls and presentation controls from a control factory.

7. The system of claim 6, further comprising displaying or otherwise executing the application, together with business controls and presentation controls.

8. The system of claim 1, further comprising periodically determining the current state of the application on the portal server, and parsing the webflow file to update the application display to the user.

9. A method for software application development in a portal environment, comprising the steps of:

providing a framework comprising a design-time environment and a run-time environment, the framework adapted to switch between the design-time environment and the run-time environment;

wherein the design-time environment allows the design of a portal application, said design-time environment including a Java Server Page design editor component to create JSP pages, and, a webflow design editor component providing a graphical interface with a visual display of portal application flow indicating possible transitions between pages of the portal application, the webflow design editor component being used to create and update a webflow file using the graphical interface, the webflow file including annotations, wherein some of the annotations declare possible destinations of a flow transition, and other annotations dictate what state is shared between which JSP pages;

wherein the run-time environment runs said portal application, said run-time environment including an application flow and state management component using the annotations of the webflow file to determine:

the state and current page of the portal application and when to execute at least one of the JSP pages, wherein the run-time environment deploys the at least one of the JSP pages as indicated by the application flow and management component;

wherein switching to the run-time environment includes enabling the user to deploy the portal application as per the webflow file and the JSPs, the webflow file and the JSPs being defined and modified for the deployment instance; and wherein switching to the design time environment includes enabling the user to access to the Java Server Page design editor component to modify one of the JSPs or to access webflow design editor and update at least one of the annotations of the webflow file, wherein at least one webflow file is updatable and reusable for one or more the portal application runs; wherein at least one change made in one of the webflow file is dynamically reflected in the webflow editor component.

10. The method of claim 9 wherein the a control container and lifecycle driver component is used to determine the look-and-feel of the portal application interface.

11. The method of claim 9 wherein the a control factory component uses a factory for control creation, and subsequently drives control lifecycles during portal application request handling.

12. The method of claim 9 further comprising the step of: using the Java Server Page design editor to create or update embedded controls in a JSP page.

13. The method of claim 9 further comprising the step of: performing a visual test or debug of the application.

14. The method of claim 9 further comprising the step of: populating a control container at the portal server with business controls and presentation controls from a control factory.

15. The method of claim 14 further comprising the step of: displaying or otherwise executing the application, together with business controls and presentation controls.

16. The method of claim 9 further comprising the step of: periodically determining the current state of the application on the portal server, and parsing the webflow file to update the application display to the user.

17. A computer readable medium, including instructions stored thereon which when executed cause the computer to perform the method for software application development in a portal environment, comprising the steps of:
providing a framework comprising a design-time environment and a run-time environment, the framework adapted to switch between the design-time environment and the run-time environment;
wherein the design-time environment allows the design of a portal application, said design-time environment including
a Java Server Page design editor component to create JSP pages, and,
a webflow design editor component providing a graphical interface with a visual display of portal application flow indicating possible transitions between pages of the portal application, the webflow design editor component being used to create and update a webflow file using the graphical interface, the webflow file including annotations, wherein some of the annotations declare possible destinations of a flow transition, and other annotations dictate what state is shared between which JSP pages;
wherein the run-time environment runs said portal application, said run-time environment including
an application flow and state management component using the annotations of the webflow file to determine:
the state and cuffent page of the portal application and when to execute at least one of the JSP pages,
wherein the run-time environment deploys the at least one of the JSP pages as indicated by the application flow and management component;
wherein switching to the run-time environment includes enabling the user to deploy the portal application as per the webflow file and the JSPs, the webflow file and the JSPs being defined and modified for the deployment instance: and wherein switching to the design time environment includes enabling the user to access to the Java Server Page design editor component to modify one of the JSPs or to access webflow design editor and update at least one of the annotations of the webflow file;
wherein at least one webflow file is updatable and reusable for one or more the portal application runs; wherein at least one change made in one of the webflow file is dynamically reflected in the webflow editor component.

18. The computer readable medium of claim 17 wherein the a control container and lifecycle driver component is used to determine the look-and-feel of the portal application interface.

19. The computer readable medium of claim 17 wherein the a control factory component uses a factory for control creation, and subsequently drives control lifecycles during portal application request handling.

20. The computer readable medium of claim 17, further comprising using the Java Server Page design editor to create or update embedded controls in a JSP page.

21. The computer readable medium of claim 17, further comprising performing a visual test or debug of the application.

22. The computer readable medium of claim 17, further comprising populating a control container at the portal server with business controls and presentation controls from a control factory.

23. The computer readable medium of claim 22, further comprising displaying or otherwise executing the application, together with business controls and presentation controls.

24. The computer readable medium of claim 17, further comprising periodically determining the current state of the application on the portal server, and parsing the webflow file to update the application display to the user.

* * * * *